US010951946B2

(12) United States Patent
Halepovic

(10) Patent No.: US 10,951,946 B2
(45) **Date of Patent: *Mar. 16, 2021**

(54) DETERMINING A QUALITY OF EXPERIENCE METRIC BASED ON UNIFORM RESOURCE LOCATOR DATA

(71) Applicant: AT&T Intellectual Property I, L.P., Atlanta, GA (US)

(72) Inventor: Emir Halepovic, Somerset, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,077

(22) Filed: May 5, 2020

(65) Prior Publication Data

US 2020/0267445 A1 Aug. 20, 2020

Related U.S. Application Data

(63) Continuation of application No. 16/411,970, filed on May 14, 2019, now Pat. No. 10,681,413, which is a (Continued)

(51) Int. Cl.
*H04N 21/442* (2011.01)
*H04N 21/24* (2011.01)
(Continued)

(52) U.S. Cl.
CPC ... *H04N 21/44209* (2013.01); *H04L 41/5067* (2013.01); *H04L 43/026* (2013.01); (Continued)

(58) Field of Classification Search
CPC ....... H04N 21/44209; H04N 21/23418; H04N 21/23805; H04N 21/2402; H04N 21/4621;
(Continued)

(56) References Cited

U.S. PATENT DOCUMENTS 7,933,410 B2 4/2011 Fahrny
8,826,349 B2 9/2014 Joe et al.
(Continued)

FOREIGN PATENT DOCUMENTS

CA 2870059 A1 10/2013
EP 2773078 A1 9/2014
EP 2830322 A1 1/2015

OTHER PUBLICATIONS

Bouten, N et al., "A Multicast-Enabled Delivery Framework for QoE Assurance of Over-The-Top Services in Multimedia Access Networks", Journal of Network and Systems Management, vol. 21, Issue 4, Dec. 2013, 667-706.

(Continued)

*Primary Examiner* — Sm A Rahman
(74) *Attorney, Agent, or Firm* — Guntin & Gust, PLC; Dana Lemoine

(57) ABSTRACT

A method includes receiving, at a server associated with a network operator, a plurality of uniform resource locators (URLs) associated with a media stream provided to a client device. The method includes processing, at the server, the plurality of URLs to determine a quality of experience metric. Processing the plurality of URLs includes extracting first URL data from a first URL and second URL data from a second URL of the plurality of URLs. The first URL data includes a first segment identifier associated with a first segment of a media content item and a first bit rate identifier. The second URL data includes a second segment identifier associated with a second segment of the media content item and a second bit rate identifier. A quality of experience metric may be determined based at least in part on the first URL data and the second URL data.

20 Claims, 6 Drawing Sheets

Related U.S. Application Data continuation of application No. 14/858,197, filed on Sep. 18, 2015, now Pat. No. 10,334,316.

(51) Int. Cl.

| | |
|---|---|
| ***H04N 21/234*** | (2011.01) |
| ***H04L 12/24*** | (2006.01) |
| ***H04L 12/26*** | (2006.01) |
| ***H04N 21/238*** | (2011.01) |
| ***H04N 21/658*** | (2011.01) |
| ***H04N 21/845*** | (2011.01) |
| ***H04N 21/858*** | (2011.01) |
| ***H04N 21/84*** | (2011.01) |
| ***H04N 21/462*** | (2011.01) |

(52) U.S. Cl.

CPC ..... *H04L 43/045* (2013.01); *H04N 21/23418* (2013.01); *H04N 21/23805* (2013.01); *H04N 21/2402* (2013.01); *H04N 21/4621* (2013.01); *H04N 21/6581* (2013.01); *H04N 21/84* (2013.01); *H04N 21/8456* (2013.01); *H04N 21/8586* (2013.01)

(58) Field of Classification Search

CPC ............... H04N 21/6581; H04N 21/84; H04N 21/8456; H04N 21/8586; H04L 41/5067; H04L 43/026; H04L 43/045

See application file for complete search history.

(56) References Cited

U.S. PATENT DOCUMENTS

| | | | | |
|---|---|---|---|---|
| 9,037,743 | B2 | 5/2015 | Kordasiewicz et al. | |
| 2011/0302319 | A1 | 12/2011 | Ha et al. | |
| 2012/0151009 | A1 | 6/2012 | Bouazizi et al. | |
| 2012/0210216 | A1 | 8/2012 | Hurst | |
| 2013/0042276 | A1 | 2/2013 | Payette et al. | |
| 2013/0051554 | A1* | 2/2013 | Braness | H04N 21/6581 380/200 |
| 2013/0067109 | A1 | 3/2013 | Dong et al. | |
| 2013/0117770 | A1 | 5/2013 | Mineyama et al. | |
| 2013/0124329 | A1* | 5/2013 | Tengler | G06Q 30/0261 705/14.66 |
| 2013/0179588 | A1 | 7/2013 | McCarthy et al. | |
| 2013/0179590 | A1 | 7/2013 | Mccarthy et al. | |
| 2013/0286879 | A1 | 10/2013 | Elarabawy et al. | |
| 2014/0161050 | A1 | 6/2014 | Grinshpun et al. | |
| 2014/0219088 | A1 | 8/2014 | Oyman et al. | |
| 2014/0269269 | A1 | 9/2014 | Kovvali et al. | |
| 2014/0282986 | A1 | 9/2014 | Leung et al. | |
| 2014/0317668 | A1* | 10/2014 | Zhang | H04N 21/23439 725/116 |
| 2014/0321274 | A1 | 10/2014 | Gahm et al. | |
| 2014/0321561 | A1 | 10/2014 | Stec et al. | |
| 2014/0337518 | A1 | 11/2014 | Garcia et al. | |
| 2014/0351385 | A1 | 11/2014 | Li et al. | |
| 2014/0365677 | A1 | 12/2014 | Mueller et al. | |
| 2015/0163273 | A1 | 6/2015 | Radcliffe et al. | |
| 2015/0256581 | A1 | 9/2015 | Kolhi et al. | |
| 2016/0127260 | A1 | 5/2016 | Gordon | |
| 2017/0055012 | A1 | 2/2017 | Phillips et al. | |
| 2017/0332116 | A1* | 11/2017 | Lee | H04N 21/431 |

OTHER PUBLICATIONS

Gouache, S et al., "Distributed & Adaptive HTTP Streaming", 2011 IEEE International Conference on Multimedia and Expo (ICME), IEEE, 2011, 1-6.

Gouta, A et al., "Large Scale Analysis of HTTP Adaptive Streaming in Mobile Networks", 2013 IEEE 14th International Symposium on "A World of Wireless, Mobile and Multimedia Networks" (WoWMoM), 2013, 1-10.

Nam, H et al., "A Mobile Video Traffic Analysis: Badly Designed Video Clients Can Waste Network Bandwidth", 2013 IEEE Globecom Workshops (GC Wkshps),, Dec. 2013, 512-517.

Qadir, Muhammad, "Mechanisms for QoE optimisation of Video Traffic: A review paper", Australasian Journal of Information, Communication Technology and Applications, vol. 1, Issue 1, 2015, 1-18.

Talan, M t al., "Mobile Mul Ti Media Traffic Analysis: Clients Can Waste Network Bandwidth", IJCSMC, vol. 3, Issue 5, May 5, 2014, 8 pages.

* cited by examiner

DETERMINING A QUALITY OF EXPERIENCE METRIC BASED ON UNIFORM RESOURCE LOCATOR DATA

PRIORITY CLAIM

This application claims priority from, and is a continuation of, U.S. patent application Ser. No. 16/411,970, filed May 14, 2019, pending, which is a continuation of U.S. patent application Ser. No. 14/858,197, filed Sep. 18, 2015, now U.S. Pat. No. 10,334,316. The contents of the foregoing applications and patents are hereby incorporated by reference into this application as if set forth herein in full.

FIELD OF THE DISCLOSURE

The present disclosure is generally related to determining a quality of experience metric based on uniform resource locator data.

BACKGROUND

An over-the-top (OTT) video delivery service may utilize an HTTP-based stream delivery approach to provide content over a network (e.g., a mobile communications network). For example, video delivery services and techniques for adaptive bit rate (ABR) streaming have been used for OTT video delivery. For ABR streaming over HTTP, videos are encoded into multiple quality levels (encoding bit rates) and stored at HTTP servers. For each quality level, a video is divided into chunks or segments, and a client requests chunks of the quality level based on network conditions. Thus, ABR streaming is a client-driven approach to video delivery that may provide video content at different quality levels depending on the network conditions.

While adaptively varying the bit rate may allow for video streaming under various bandwidth conditions, delivering lower quality video may result in a poor quality of experience (QoE) from the perspective of a consumer of the video content. In such cases, the consumer may assign responsibility for the poor QoE to a network operator, such as an operator of a wireless communications network. However, the network operator may not have control or access to communication devices (e.g., user devices or video content servers). As such, the network operator may not have visibility into certain aspects that affect service quality, such as bitrate or resolution of the video stream. In order to estimate QoE metrics from the perspective of the user, the network operator may rely on passive traffic monitoring. However, hardware and/or software associated with extracting information from monitored packet data traffic may be expensive. Further, video quality at a user device is difficult for a network operator to estimate by passively monitoring packet data.

DETAILED DESCRIPTION

Figure 1:
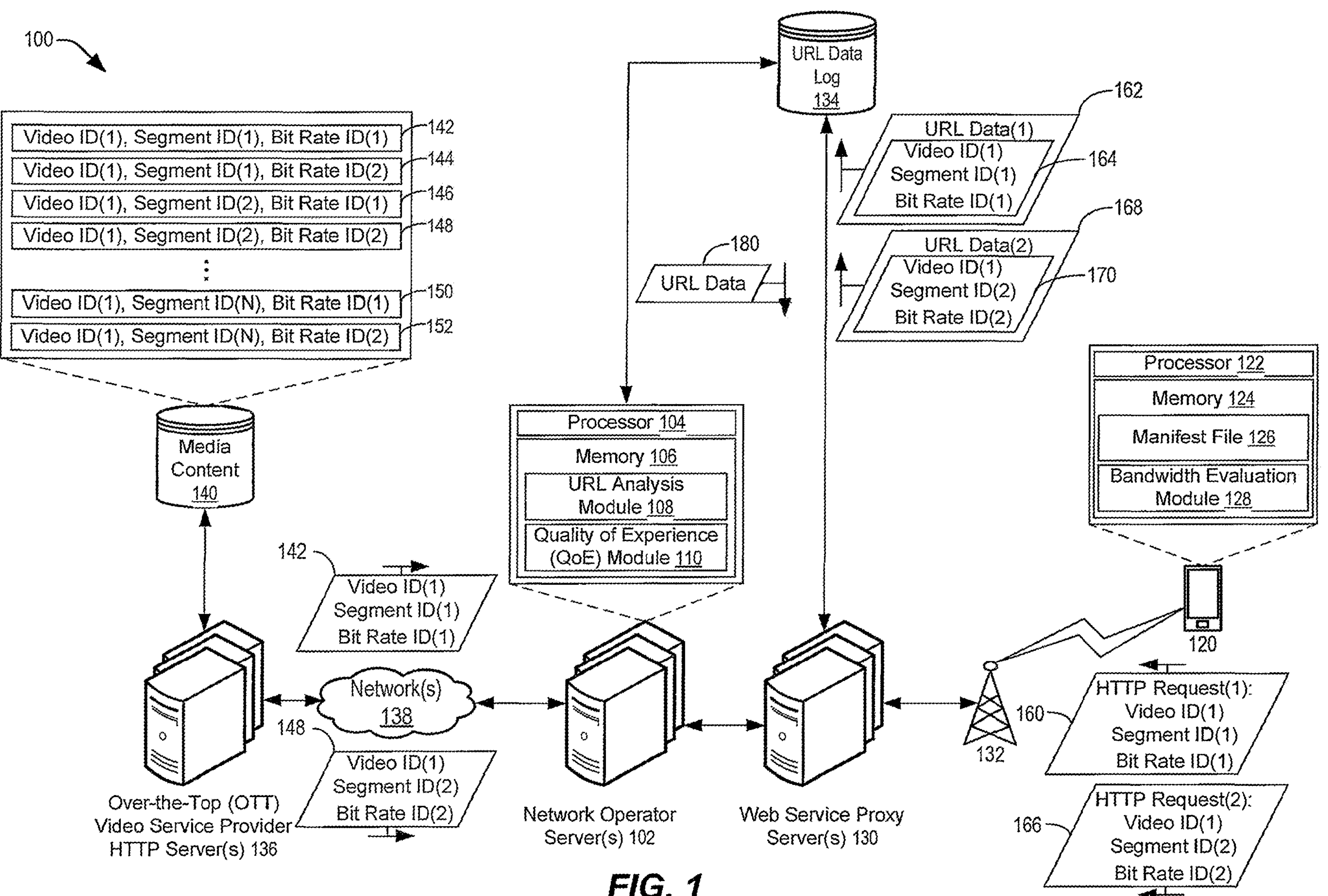
FIG. 1 is a block diagram of an embodiment of a system for determining a QoE metric based on URL data extracted from a plurality of URLs associated with a media stream provided to a client device.

The present disclosure relates to systems and methods of estimating video quality (from a perspective of an end user at a client device) by extracting information from hypertext transfer protocol (HTTP) data that is available to a network operator. In the present disclosure, HTTP data may be utilized to extract ground truth service quality and/or to estimate service quality of an OTT ABR video stream. Unlike deep packet inspection (DPI) techniques used to extract video container headers, the present disclosure utilizes HTTP-level information to recognize patterns and technical details of video delivery, chunking of the video stream, and an underlying technology/standard employed. The data extracted from the HTTP-level information may be used to determine meta-data of the video session by observing server logs, such as web proxy logs. The method of the present disclosure may provide a network operator with information related to the quality of a video service as perceived by the customer for operational, planning and other purposes.

Existing DPI systems examine the payload of packets in order to extract video resolution, bitrate and other metrics for Progressive Download (PD) video, which use a single transfer and typically a single quality level (e.g., 360p or 480p resolution). MPEG headers contain such information, and the payload of user data packets is accessed and processed by the DPI system in order to extract the information. By contrast, one or more exemplary embodiments of the present disclosure may utilize URLs and HTTP headers, which are protocol headers that are routinely inspected by web proxies of a network operator (e.g., a wireless communications network operator). No user data, such as MPEG video headers and payload, is accessed. In some cases, HTTP header logs may be saved by network equipment (e.g., a network web proxy service), potentially making the QoE estimation method of the present disclosure an attractive and cost-effective solution for a network operator.

The present disclosure relies on HTTP URLs that may contain sufficient information to allow a network operator to generate a "skeleton" of a video session. To illustrate, URLs may contain "clues" about chunk boundaries, video/audio rates, an adaptation algorithm, playback progress, and other information. Such information may be utilized to recognize bitrates, bit rate changes, and play position and trick play (e.g., fast forward, rewind, pause, etc.). In some cases, a web proxy service for a network, such as a wireless communications network, may log URL requests. In such cases, the URL requests that are logged by the web proxy service represent a source of URL data that is available to a network operator.

For ABR streaming, video associated with each quality level may be stored as a file that is accessible via a URL and an index of chunk IDs (or byte offsets as boundaries). A chunk associated with a particular chunk ID may have a fixed duration (e.g., 10 seconds). A manifest file may provide instructions to a client device regarding retrieval of chunks. As an illustrative example, a network operator may reconstruct a video session using common Movie ID, video bitrates, and a number of downloaded segments extracted from URL data (depending on a particular URL encoding scheme). The reconstructed video session may provide the network operator with QoE information without relying on deep packet inspection techniques. It will be appreciated that different OTT services may use different URL encoding schemes, and alternative evaluation approaches may be utilized in such cases (as described further herein).

By observing and tracking information related to a user's video quality, an operator may assess the performance of the network and services, estimate user satisfaction and impact/improve the service quality by provisioning, planning, and active management. An example of active management may include predicting and communicating to the user what to expect from the network and adjust the demand.

In a particular embodiment, a method includes receiving, at a server associated with a network operator, a plurality of URLs associated with a media slTeam provided to a client device. The plurality of URLs includes a first URL and a second URL. The method includes processing, at the server, the plurality of URLs to determine a quality of experience (QoE) metric. Processing the plurality of URLs includes extracting first URL data from the first URL and extracting second URL data from the second URL. The first URL data includes a first segment identifier associated with a first segment of a media content item and a first bit rate identifier. The second URL data includes a second segment identifier associated with a second segment of the media content item and a second bit rate identifier. The method further includes determining the QoE metric based at least in part on the first URL data and the second URL data.

In a particular embodiment, a system includes a processor and a memory accessible to the processor. The memory stores instructions that are executable by the processor to perform various operations. The operations may include receiving a plurality of URLs associated with a media stream provided to a client device from an over-the-top (OTT) video service provider. The operations also include extracting first URL data from a first URL of the plurality of URLs and extracting second URL data from a second URL of the plurality of URLs. The first URL data includes a first segment identifier associated with a first segment of a media content item and a first bit rate identifier. The second URL data includes a second segment identifier associated with a second segment of the media content item and a second bit rate identifier. The operations may further include determining a QoE metric based at least in part on the first URL data and the second URL data.

In a particular embodiment, a computer-readable storage device stores instructions, that when executed by a processor, cause the processor to perform various operations. The operations may include receiving a plurality of URLs associated with a media stream provided to a client device from an OTT video service provider. The operations include extracting first URL data from a first URL of the plurality of URLs and extracting second URL data from a second URL of the plurality of URLs. The first URL data includes a first segment identifier associated with a first segment of a media content item and a first adaptive bit rate (ABR) identifier. The second URL data includes a second segment identifier associated with a second segment of the media content item and a second ABR identifier. The operations further include determining a QoE metric based at least in part on the first URL data and the second URL data.

Referring to FIG. 1, a particular embodiment of a system of determining a QoE metric based on URL data extracted from a plurality ofURLs associated with a media stream provided to a client device is illustrated and generally designated 100. FIG. 1 illustrates an example in which a video service provider that is different from a network operator (an "over-the-top" video service provider) generates a media stream to be communicated to a client device via a wireless communications network of the network operator.

In the particular embodiment illustrated in FIG. 1, the system 100 includes a network operator server 102 (or multiple servers) associated with a network operator (identified as "Network Operator Server(s)" in FIG. 1). The network operator server 102 may include a processor 104 (or multiple processors) and a memory 106 that is accessible to the processor 104. The memory 106 may store instructions that are executable by the processor 104 to perform various operations, as further described herein. In the particular embodiment illustrated in FIG. 1, the memory 106 stores a URL analysis module 108 and a QoE module 110.

As described further herein, the network operator server 102 may be configured to receive a plurality of URLs associated with a media stream provided to a client device 120. In a particular embodiment, the media stream may be communicated to the client device 120 from an OTT video service provider that is different from the network operator. FIG. 1 illustrates a particular embodiment in which the network operator is a wireless communications network operator, and the media stream is communicated from the OTT video service provider via the wireless communications network.

The plurality of URLs received at the network operator server 102 may include at least a first URL and a second URL. As described further herein, the network operator server 102 may be configured to process the plurality ofURLs to determine a QoE metric (e.g., an estimate of a quality of a media stream from a perspective of a user that views the media stream at the client device 120). The URL analysis module 108 may be configured to extract URL data from the plurality of URLs, including at least the first URL and the second URL. As described further herein, the first URL may include a first segment identifier associated with a first segment of a media content item and a first bit rate identifier. The second URL may include a second segment identifier associated with a second segment of the media content item and a second bit rate identifier. In some cases, the first bit rate identifier may be a first adaptive bit rate (ABR) identifier, and the second bit rate identifier may be a second ABR identifier (e.g., a different ABR identifier). The first ABR identifier may be associated with a first bit rate for playback of the first segment at a first resolution, and the second ABR identifier may be associated with a second bit rate for playback of the second segment at a second resolution. In other cases, the first bit rate identifier may be a fixed bit rate (FBR) identifier, and the second bit rate identifier may be the FBR identifier.

As further described herein, the QoE module 110 may be configured to determine the QoE metric based at least in part on the first URL data and the second URL data. In some cases, the QoE module 110 may be further configured to generate a report that includes the QoE metric, as illustrated and further described herein with respect to FIG. 4. As an example, the QoE metric may include a video resolution, a frame rate, a video encoding rate, an audio encoding rate, or a combination thereof (among other alternatives). As another example, the QoE metric may include an estimated mean opinion score (MOS). The estimated MOS may include a bit rate metric, a rate switching metric, a stall metric, an abandonment metric, or a combination thereof (among other alternatives).

In some embodiments, the URL analysis module 108 may be configured to extract additional URL data (e.g., third URL data, fourth URL data, etc.) from one or more additional URLs of the plurality of URLs. As an illustrative, non-limiting example, the URL analysis module 108 may be configured to extract third URL data from a third URL (not shown in FIG. 1) of the plurality of URLs. The third URL may include a third segment identifier associated with a third segment of the media content item and a third bit rate identifier. In this case, the QoE module 110 may be configured to determine the QoE metric based on the first URL data (extracted from the first URL), the second URL data (extracted from the second URL), and the third URL data (extracted from the third URL). It will be appreciated that similar extraction and QoE metric estimation may be performed for more than three URLs.

In the example illustrated in FIG. 1, the client device 120 includes a processor 122 and a memory 124 accessible to the processor 122. The memory 124 may store instructions that are executable by the processor 122 to perform various operations, as described further herein. In FIG. 1, the memory 124 stores a manifest file 126 and a bandwidth evaluation module 128. The manifest file 126 may include instructions for retrieval of segments (also referred to herein as "chunks") of media content of different quality levels. The bandwidth evaluation module 128 may be configured to evaluate network conditions in order to identify a quality level of a chunk of media content to be requested. Based on a result of the bandwidth evaluation performed by the bandwidth evaluation module 128, the client device 120 may generate a request based on information included inthe manifest file 126.

In the particular embodiment illustrated in FIG. 1, the client device 120 may communicate with the network operator server 102 via a web service proxy server 130 (or multiple servers), such as via a wireless network component 132 (e.g., a cellular tower or other wireless access point). FIG. 1 illustrates that the web service proxy server 130 may be configured to log URL information requested by the client device 120 (and other client devices) at a memory (e.g., at a URL data log database 134 in the example of FIG. 1). As described further herein, the network operator server 102 may retrieve URL information from the URL data log database 134 for processing.

In the particular embodiment illustrated in FIG. 1, an over-the-top (OTT) video service provider HTTP server 136 (or multiple servers) may be configured to provide media content to the client device 120 (e.g., via a network 138). FIG. 1 illustrates that a media content database 140 may be accessible to the OTT video service provider HTTP server 136. As illustrated in FIG. 1, the media content database 140 may store multiple segments of a media content item. ABR streaming represents a client-driven approach to media content delivery. Chunk duration, a number of quality levels, and delivery strategy may differ across clients, streaming services, mobile operating system type, etc. In the context of ABR streaming over HTTP, a media content item (e.g., a video) may be encoded into multiple quality levels corresponding to different encoding bit rates. Each quality level may be divided into chunks or segments. The client device 120 may request chunks of the quality based on network conditions (e.g., based on a bandwidth estimate by the bandwidth evaluation module 128).

FIG. 1 shows an illustrative example in which a media content item is encoded into two quality levels. To illustrate, the media content database 140 of FIG. 1 stores a first segment of a media content item encoded at a first bit rate 142. The media content database 140 also stores the first segment of the media content item encoded at a second bit rate 144. For illustrative purposes only, FIG. 1 depicts the media content item encoded at the first bit rate 142 as "Video ID(1), Segment ID(1), Bit Rate ID(1)" and the media content item encoded at the second bit rate 144 as "Video ID(1), Segment ID(1), Bit Rate ID(2)." In alternative embodiments, media content items may be encoded into more than two quality levels, and chunks associated with each quality level may be stored at the media content database 140.

FIG. 1 also illustrates that the media content database 140 of FIG. 1 stores a second segment of the media content item encoded at the first bit rate 146 (identified as "Video ID(1), Segment ID(2), Bit Rate ID(1)" in FIG. 1). The media content database 140 also stores the second segment of the media content item encoded at the second bit rate 148 (identified as "Video ID(1), Segment ID(2), Bit Rate ID(2)" in FIG. 1). FIG. 1 further illustrates that the media content item may be divided into more than two chunks/segments, as represented by the integer N (where N>2). To illustrate, an Nth segment of the media content item encoded at the first bit rate 150 is identified as "Video ID(1), Segment ID(N), Bit Rate ID(1)" in FIG. 1. The Nth segment of the media content item encoded at the second bit rate 152 is identified as "Video ID(1), Segment ID(N), Bit Rate ID(2)" in FIG. 1.

In operation, the client device 120 may send a first HTTP request 160 (identified as "HTTP Request (1)" in FIG. 1) to the network operator server 102. FIG. 1 illustrates that the first HTTP request 160 may correspond to a first URL that includes a first segment identifier ("Segment ID(1)") associated with a first segment of a media content item ("Video ID(1)") and a first bit rate identifier ("Bit Rate ID(1)"). In a particular embodiment, the first bit rate identifier ("Bit Rate ID(1)") may include a first ABR identifier (e.g., an identifier corresponding to a bit rate of 400 Kbps, as described further herein with respect to FIG. 2). The first ABR identifier may be associated with a first bit rate for playback of the first segment ("Segment ID(1)") at a first resolution. In other cases, the first bit rate identifier ("Bit Rate ID(1)") may include a fixed bit rate (FBR) identifier.

Figure 2:
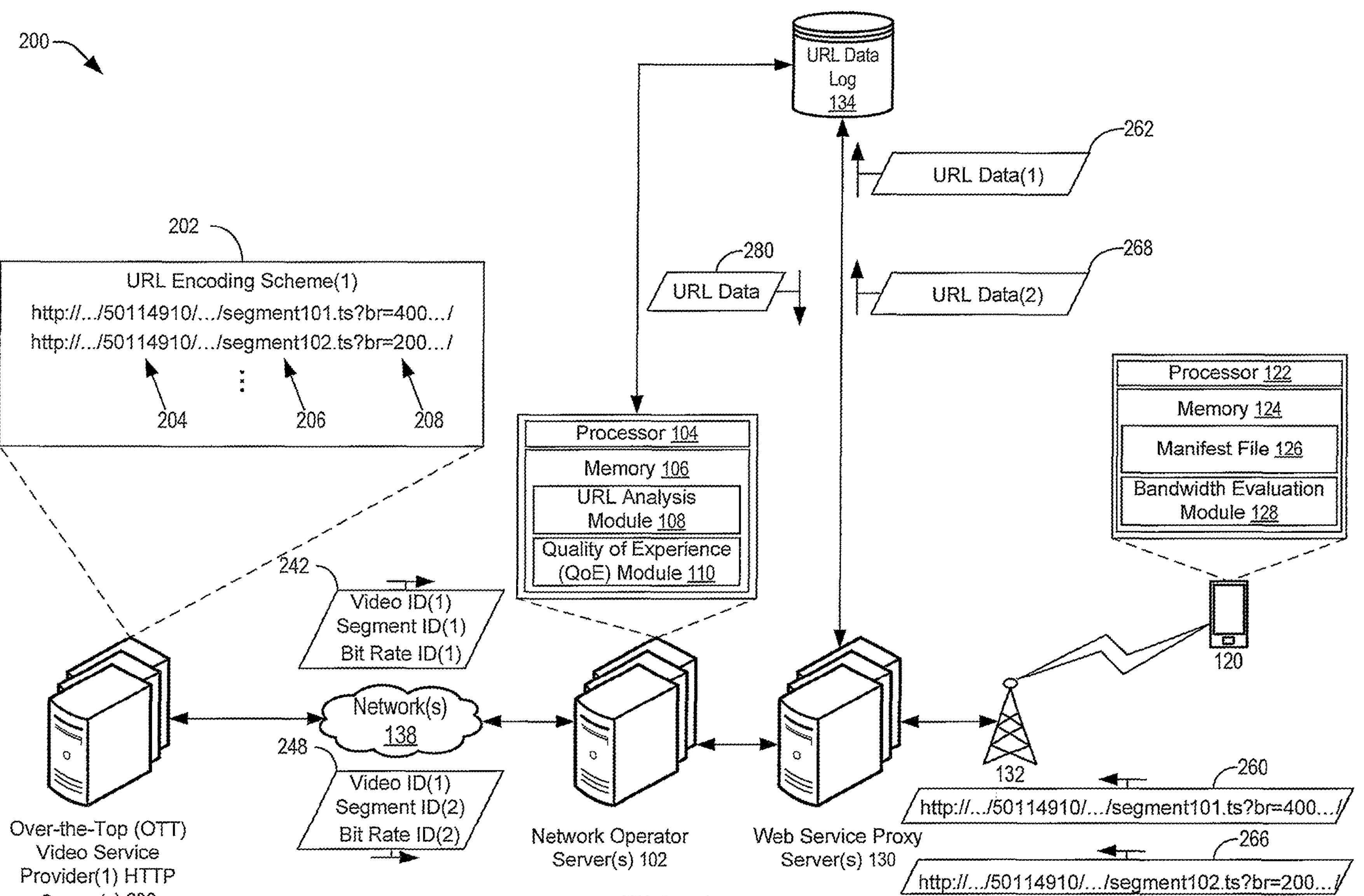
FIG. 2 is a block diagram of another embodiment of a system for determining a QoE metric based on URL data extracted from a plurality of URLs associated with a media stream provided to a client device.
Figure 3:
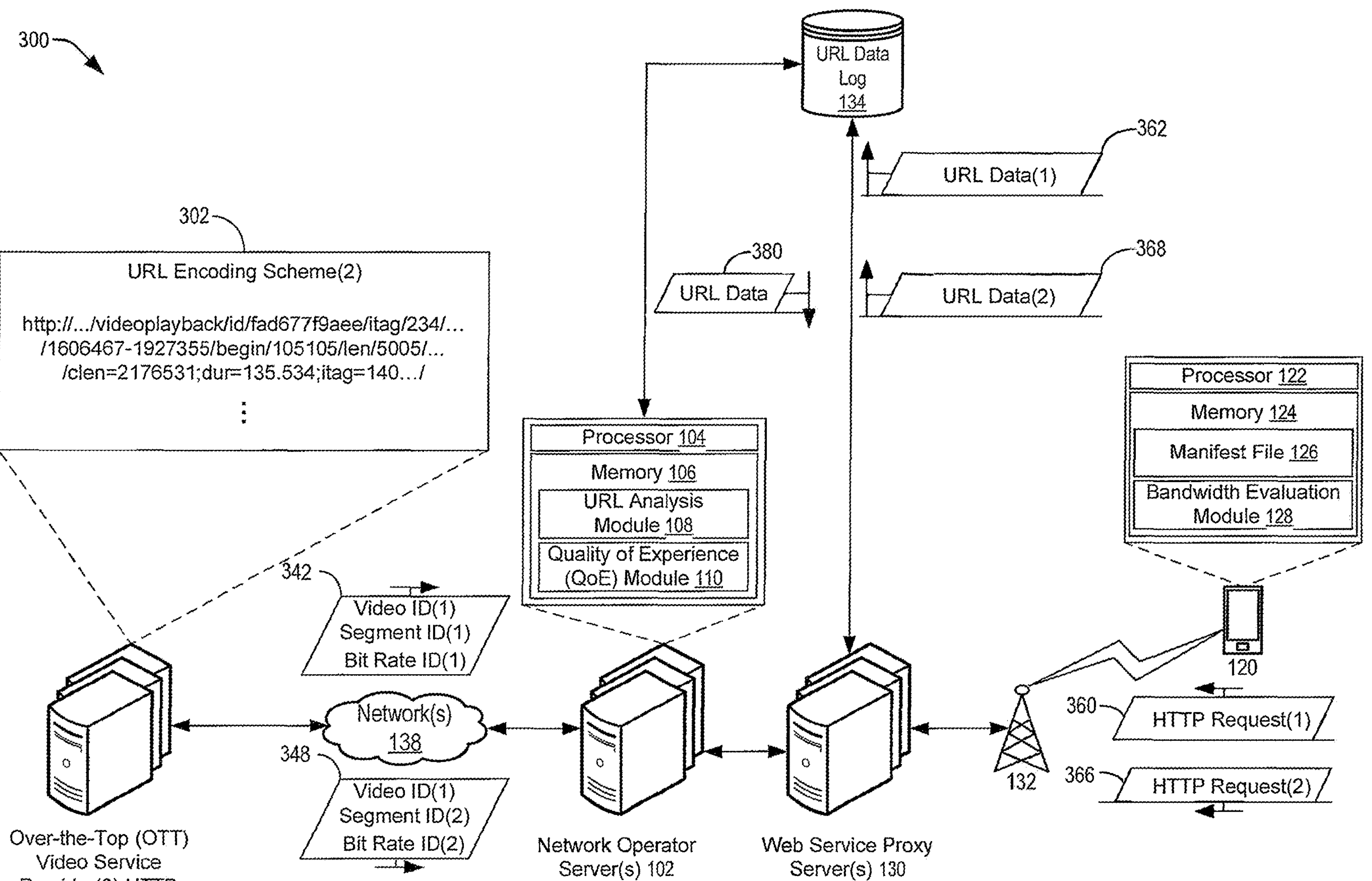
FIG. 3 is a block diagram of another embodiment of a system for determining a QoE metric based on URL data extracted from a plurality of URLs associated with a media stream provided to a client device.

As described further herein with respect to FIGS. 2 and 3, a format of a URL associated with the first HTTP request 160 may be determined based on information in the manifest file 126. Various URL encoding schemes may utilize various approaches to identify a media content item, a segment, a bit rate, etc. As such, the format of the URL associated with the first HTTP request 160 may vary for different media stream providers. In some cases, the manifest file 126 may represent one manifest file associated with a particular media stream provider, while another manifest file (not shown in FIG. 1) may be stored at the memory 124 for the client device 120 to retrieve media content from another media stream provider.

In the example of FIG. 1, the client device 120 communicates the first HTTP request 160 to the network operator server 102 via the web proxy service server 130. FIG. 1 illustrates that the web proxy service server 130 may store information associated with the first HTTP request 160 as first URL data 162 (identified as "URL Data(1)" in FIG. 1)

at the URL data log database 134. As shown in FIG. 1, the first URL data 162 may include first information 164 corresponding to the first segment identifier ("Segment ID(1)") associated with the first segment of the media content item ("Video ID(1)") and the first bit rate identifier ("Bit Rate ID(1)") included in the first HTTP request 160. FIG. 1 illustrates that, responsive to the first HTTP request 160, the OTT video service provider HTTP server 136 may send the first segment of the media content item encoded at the first bit rate 142 (identified as "Video ID(1), Segment ID(1), Bit Rate ID(1)" in FIG. 1) to the client device 120.

FIG. 1 further illustrates that the client device 120 may send a second HTTP request 166 (identified as "HTTP Request (2)" in FIG. 1) to the network operator server 102. FIG. 1 illustrates that the second HTTP request 166 may correspond to a second URL that includes a segment identifier ("Segment ID(2)") associated with a second segment of the media content item ("Video ID(1)") and a second bit rate identifier ("Bit Rate ID(2)"). In a particular embodiment, the second bit rate identifier ("Bit Rate ID(2)") may include a second ABR identifier (e.g., an identifier corresponding to a bit rate of 200 Kbps, as described further herein with respect to FIG. 2). The second ABR identifier may be associated with a second bit rate for playback of the second segment ("Segment ID(2)") at a second resolution. In other cases, the second bit rate identifier ("Bit Rate ID(2)") may include a FBR identifier.

As described further herein with respect to FIGS. 2 and 3, a format of a URL associated with the second HTTP request 166 may be determined based on information in the manifest file 126. Various URL encoding schemes may utilize various approaches to identify a media content item, a segment, a bit rate, etc. As such, the format of the URL associated with the second HTTP request 166 may vary for different media stream providers.

In the example of FIG. 1, the client device 120 communicates the second HTTP request 166 to the network operator server 102 via the web proxy service server 130. FIG. 1 illustrates that the web proxy service server 130 may store information associated with the second HTTP request 166 as second URL data 168 (identified as "URL Data(2)" in FIG. 1) at the URL data log database 134. As shown in FIG. 1, the second URL data 168 may include second information 170 corresponding to the second segment identifier ("Segment ID(2)") associated with the second segment of the media content item ("Video ID(1)") and the second bit rate identifier ("Bit Rate ID(2)") included in the second HTTP request 166. FIG. 1 illustrates that, responsive to the second HTTP request 166, the OTT video service provider HTTP server 136 may send the second segment of the media content item encoded at the second bit rate 148 (identified as "Video ID(1), Segment ID(2), Bit Rate ID(2)" in FIG. 1) to the client device 120.

FIG. 1 illustrates that the network operator server 102 receives URL data 180 (that includes at least the first URL data 162 and the second URL data 168) from the URL data log database 134. The URL analysis module 108 extracts the first URL data 162 (corresponding to the first HTTP request 160) and extracts the second URL data 168 (corresponding to the second HTTP request 166). The QoE module 110 determines the QoE metric (or multiple QoE metrics) based at least in part on the first URL data 162 and the second URL data 168. As an example (as described further herein with respect to FIGS. 2 and 3), the QoE module 110 may determine, based on the URL data 180, a video resolution, a frame rate, a video encoding rate, an audio encoding rate, or a combination thereof. As another example, the QoE module 110 may determine, based on the URL data 180, an estimated mean opinion score (MOS), the estimated MOS including a bit rate metric, a rate switching metric, a stall metric, an abandonment metric, or a combination thereof.

While FIG. 1 depicts an illustrative example of an arrangement in which the network operator server(s) 102 are "inline" between the web service proxy server(s) 130 and the OTT video service provider HTTP server(s) 136, alternative arrangements may be utilized in alternative embodiments. For example, the network operator server(s) 102 may analyze URLs and produce QoE metrics. In some cases, the network operator server(s) 102 may be located within the network operator's network but not on the "content delivery path" between a client device and a content provider. Further, the network operator server(s) 102 may include one or more "analysis" servers to analyze URLs and to deliver analysis results to one or more "management" servers, which may perform prediction task(s) and other task(s) as described further herein.

Thus, FIG. 1 illustrates an example of a system of determining a QoE metric based on URL data extracted from a plurality of URLs associated with a media stream provided to a client device. In FIG. 1, QoE metric(s) may be determined based on information included in the HTTP requests generated by a client device. The client device may send the HTTP requests to a web proxy service, which may log the information. Thus, the QoE metric(s) may be determined based on logged data without cumbersome deep packet inspection techniques. As described further herein with respect to FIG. 4, QoE metric(s) determined based on extracted URL data may be used to generate a QoE report, which may be useful to a network operator.

Referring to FIG. 2, a particular embodiment of a system of determining a QoE metric based on URL data extracted from a plurality of URLs associated with a media stream provided to a client device is illustrated and is generally designated 200. FIG. 2 illustrates an example of a first URL encoding scheme 202 associated with a first OTT video service provider HTTP server 236 (or multiple servers). In a particular embodiment, the first OTT video service provider HTTP server 236 of FIG. 2 may correspond to the OTT video service provider HTTP server 136 of FIG. 1.

For illustrative purposes, the first URL encoding scheme 202 of FIG. 2 generates a URL path that is relatively easy to interpret (compared to the example encoding scheme of FIG. 3). For example, the URL path includes a media content item identifier 204 (e.g., "50114910" in the example of FIG. 2), a chunk identifier 206 (e.g., "segment101" and "segment102" in the example of FIG. 2), and a video bit rate identifier 208 (e.g., "400" Kbps and "200" Kbps). Thus, FIG. 2 depicts an example in which the video bit rate identifier 208 corresponds to an ABR identifier. Similar analysis/extraction techniques may be utilized when the video bit rate identifier 208 corresponds to a FBR identifier.

In a particular embodiment, a video session may be "rebuilt" using a common media content item identifier (e.g., "50114910" in the example of PIG. 2) requested by the client device 120 and by collecting video bit rates and number of segments downloaded. As described further herein with respect to FIG. 3, a URL encoding scheme may vary by OTT video service provider and may be considerably more complicated than the example illustrated in FIG. 2.

To illustrate, in operation, the client device 120 may generate a first HTTP request 260 that includes the media content item identifier 204 (e.g., "50114910"), a chunk identifier 206 (e.g., "segment101"), and a video bit rate identifier 208 (e.g., "400" Kbps). Portions of a URL path associated with the first HTTP request 260 are omitted from FIG. 1. However, the full URL path may be generated based on information stored in the manifest file 126.

In the example of FIG. 2, the client device 120 communicates the first HTTP request 260 to the network operator server 102 via the web proxy service server 130. The web proxy service server 130 may store information associated with the first HTTP request 260 as first URL data 262 (identified as "URL Data(1)") at the URL data log database 134. The first URL data 262 may include information corresponding to the first segment identifier (e.g., "segment101") associated with the first segment of the media content item (e.g., the media content item corresponding to the identifier "50114910") and the first bit rate identifier (e.g., "400") included in the first HTTP request 260. FIG. 2 illustrates that, responsive to the first HTTP request 260, the first OTT video service provider HTTP server 236 may send the first segment of the media content item encoded at the first bit rate 242 (identified as "Video ID(1), Segment ID(1), Bit Rate ID(1)" in FIG. 2) to the client device 120.

FIG. 2 further illustrates that the client device 120 may generate a second HTTP request 266 that includes the media content item identifier 204 (e.g., "50114910"), a chunk identifier 206 (e.g., "segment102"), and a video bit rate identifier 208 (e.g., "200" Kbps). Portions of a URL path associated with the second HTTP request 266 are omitted from FIG. 2. However, the full URL path may be generated based on information stored in the manifest file 126.

In the example of FIG. 2, the client device 120 communicates the second HTTP request 266 to the network operator server 102 via the web proxy service server 130. The web proxy service server 130 may store information associated with the second HTTP request 266 as second URL data 268 (identified as "URL Data(2)") at the URL data log database 134. The second URL data 268 may include information corresponding to the second segment identifier (e.g., "segment102") associated with the second segment of the media content item (e.g., the media content item corresponding to the identifier "50114910") and the second bit rate identifier (e.g., "200") included in the second HTTP request 266. FIG. 2 illustrates that, responsive to the second HTTP request 266, the first OTT video service provider HTTP server 236 may send the second segment of the media content item encoded at the second bit rate 248 (identified as "Video ID(1), Segment ID(2), Bit Rate ID(2)" in FIG. 2) to the client device 120.

FIG. 2 further illustrates that the network operator server 102 receives URL data 280 (that includes at least the first URL data 262 and the second URL data 268) from the URL data log database 134. The URL analysis module 108 extracts the first URL data 262 (corresponding to the first HTTP request 260) and extracts the second URL data 268 (corresponding to the second HTTP request 266). The QoE module 110 determines the QoE metric (or multiple QoE metrics) based at least in part on the first URL data 262 and the second URL data 268. To illustrate, in the example of FIG. 2, the first bit rate identifier in the first URL data 262 corresponds to an adaptive bit rate of 400 Kbps, while the second bit rate identifier in the second URL data 268 corresponds to an adaptive bit rate of 200 Kbps. In this case, the QoE metric may indicate that the client device 120 experienced at least one ABR rate change (as illustrated and further described herein with respect to FIG. 4). From a perspective of a user at the client device 120 a reduced, ABR rate change may represent a lower quality of experience. The quality of experience may be represented by a QoE metric such as bit rate or an average bit rate (e.g. an average of 200 Kbps and 400 Kbps=300 Kbps).

Thus, FIG. 2 illustrates an example of a system of determining a QoE metric based on URL data extracted from a plurality of URLs associated with a media stream provided to a client device. FIG. 2 depicts a relatively simple URL encoding scheme (compared to the encoding scheme of FIG. 3) in order to illustrate that QoE metrics may be determined based on information included in the HTTP requests generated by a client device. The client device may send the HTTP requests to a web proxy service, which may log the information. Thus, the QoE metric(s) may be determined based on logged data (e.g., at the web proxy service) without relying on deep packet inspection techniques.

Referring to FIG. 3, a particular embodiment of a system of determining a QoE metric based on URL data extracted from a plurality of URLs associated with a media stream provided to a client device is illustrated and is generally designated 300. FIG. 3 illustrates an example of a second URL encoding scheme 302 associated with a second OTT video service provider HTTP server 336 (or multiple servers). In a particular embodiment, the second OTT video service provider HTTP server 336 of FIG. 3 may correspond to the OTT video service provider HTTP server 136 of FIG. 1.

FIG. 3 illustrates an example of a URL path that is more complex than the example URL path of FIG. 2 but that may offer more information for QoE metric evaluation. To illustrate, "fad677f9aee" may represent a movie identifier (assigned by the second OTT video service provider), the "itag/234" parameter may "map" to a quality level (e.g., a bit rate of 128 Kbps), "1606467-1927355" may represent a byte range (or segment), "105105" may represent a play position, "5005" may represent a chunk duration (e.g., 5.005 s), "clen=2176531" may identify a file length (e.g., 2,176,531 bytes), "dm=135.534" may identify a video duration (e.g., 135.534 s), and "itag=140" may identify parameter list information. FIG. 3 depicts an example of a single URL having a complex URL path for illustrative purposes. Another example of a URL based on the second encoding scheme 302 of FIG. 3 may include different parameters, such as a different itag parameter (e.g., "itag/269") that may correspond to another quality level (e.g., a bit rate of 100 Kbps).

To illustrate, in operation, the client device 120 may generate a first HTTP request 360. For illustrative purposes, a full URL path corresponding to the first HTTP request 360 has been omitted from FIG. 3. However, it will be appreciated that the manifest file 126 may include information associated with the second URL encoding scheme 302, and the client device 120 may generate the first HTTP request 360 based on the information stored in the manifest file 126.

In the example of FIG. 3, the client device 120 communicates the first HTTP request 360 to the network operator server 102 via the web proxy service server 130. The web proxy service server 130 may store information associated with the first HTTP request 360 as first URL data 362 (identified as "URL Data(1)") at the URL data log database 134. FIG. 3 illustrates that, responsive to the first HTTP request 360, the second OTT video service provider HTTP server 336 may send a first segment of the media content item encoded at a first bit rate 342 (identified as "Video ID(1), Segment ID(1), Bit Rate ID(1)" in FIG. 3) to the client device 120.

FIG. 3 further illustrates that the client device 120 may generate a second HTTP request 366. For illustrative purposes, a full URL path corresponding to the second HTTP request 366 has been omitted from FIG. 3. However, it will be appreciated that the manifest file 126 may include information associated with the second URL encoding scheme 302, and the client device 120 may generate the second HTTP request 366 based on the information stored in the manifest file 126.

In the example of FIG. 3, the client device 120 communicates the second HTTP request 366 to the network operator server 102 via the web proxy service server 130. The web proxy service server 130 may store information associated with the second HTTP request 366 as second URL data 368 (identified as "URL Data(2)") at the URL data log database 134. FIG. 3 illustrates that, responsive to the second HTTP request 366, the second OTT video service provider HTTP server 336 may send the second segment of the media content item encoded at a second bit rate 348 (identified as "Video ID(1), Segment ID(2), Bit Rate ID(2)" in FIG. 3) to the client device 120.

FIG. 3 further illustrates that the network operator server 102 receives URL data 380 (that includes at least the first URL data 362 and the second URL data 368) from the URL data log database 134. The URL analysis module 108 extracts the first URL data 362 (corresponding to the first HTTP request 360) and extracts the second URL data 368 (corresponding to the second HTTP request 366). The QoE module 110 determines the QoE metric (or multiple QoE metrics) based at least in part on the first URL data 362 and the second URL data 368. To illustrate, for the second URL encoding scheme 302 illustrated in FIG. 3, a first bit rate identifier in the first URL data 362 may correspond to an adaptive bit rate of 128 Kbps (e.g., determined based on the "itag/234" parameter in the example URL of FIG. 3). While not shown in the example of FIG. 3, a second bit rate identifier in the second URL data 368 may correspond to an adaptive bit rate of 100 Kbps (e.g., determined based on an "itag/269" parameter as described above). In this case, the QoE metric may indicate that the client device 120 experienced at least one ABR rate change that corresponds to a change in a QoE metric (as illustrated and further described herein with respect to FIG. 4).

Thus, FIG. 3 illustrates an example of a system of determining a QoE metric based on URL data extracted from a plurality of URLs associated with a media stream provided to a client device. FIG. 3 depicts a relatively complex URL encoding scheme (relative to the encoding scheme of FIG. 2) in order to illustrate that QoE metrics may be determined based on information included in the HTTP requests generated by a client device. The client device may send the HTTP requests to a web proxy service, which may log the information. Thus, the QoE metric(s) may be determined based on logged data without cumbersome deep packet inspection techniques.

Figure 4:
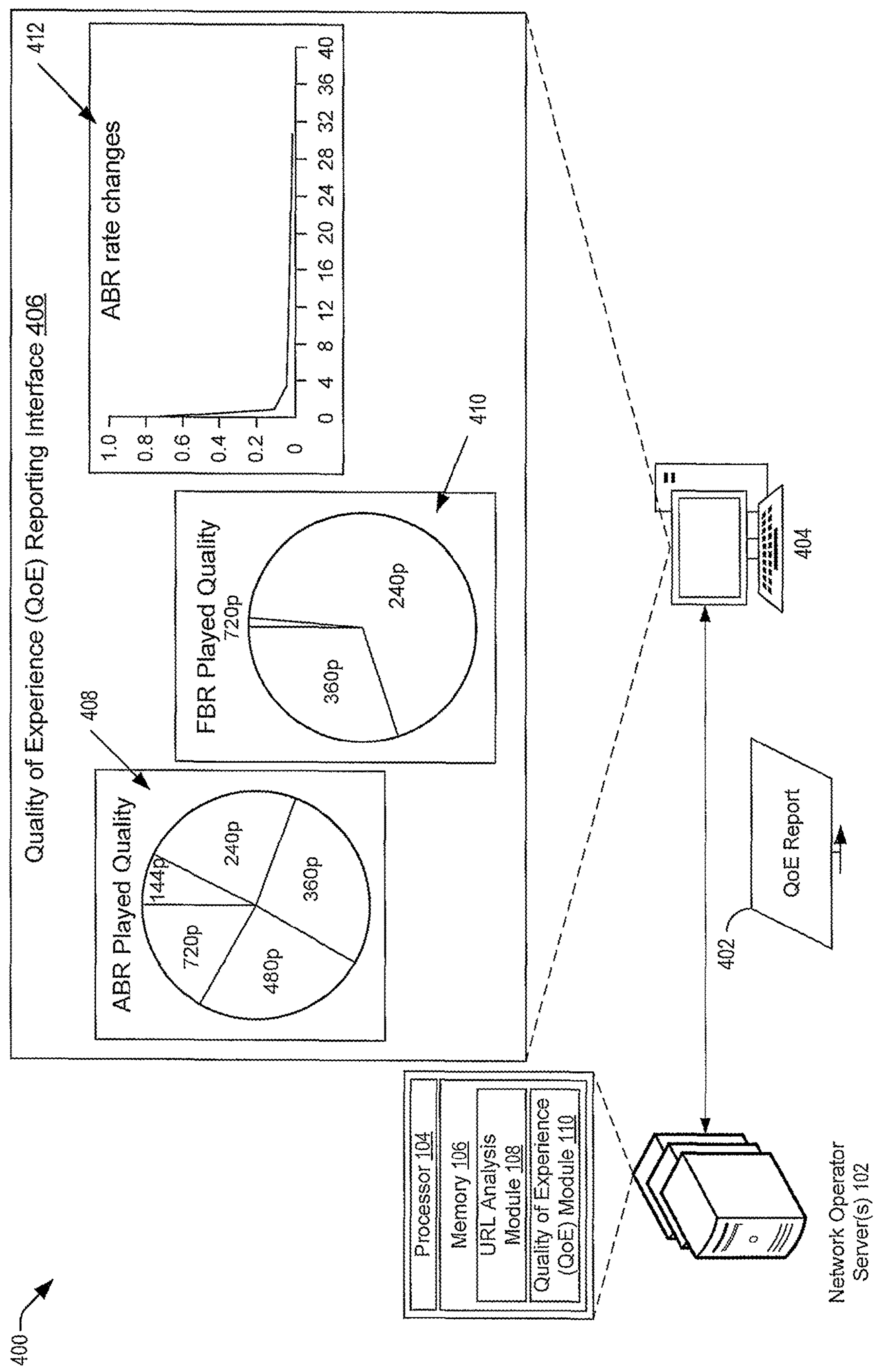
FIG. 4 is a diagram of an embodiment of a system for generating a report that includes QoE metric(s) determined based on URL data extracted from a plurality of URLs associated with a media stream provided to a client device.

FIG. 4 is a diagram 400 that illustrates an embodiment of a system for generating a report that includes QoE metric(s) determined based on URL data extracted from a plurality of URLs associated with a media stream provided to a client device. In the example of FIG. 4, an illustrative QoE report includes various QoE metrics. As an example, QoE metric(s) may include a video resolution, a frame rate, a video encoding rate, an audio encoding rate, or a combination thereof. As another example, QoE metric(s) may include estimated mean opinion score (MOS), the estimated MOS including a bit rate metric, a rate switching metric, a stall metric, an abandonment metric, or a combination thereof. Thus, the QoE report of FIG. 4 includes non-limiting illustrative examples of QoE metrics that may be generated based on extracted URL data.

In the particular embodiment illustrated in FIG. 4, the QoE module 110 of the network operator server 102 may be configured to generate a QoE report 402 (e.g., for display at a display device of a computing device 404). While FIG. 4 illustrates the computing device 404 as separate from the network operator server 102, it will be appreciated that this is for illustrative purposes only. FIG. 4 further illustrates that a QoE reporting interface 406 may display information corresponding to the QoE report 402.

In the example illustrated in FIG. 4, the QoE reporting interface 406 includes information associated with ABR played quality 408, information associated with FBR played quality 410, and information associated with a number of ABR rate changes 412. To illustrate, the information associated with the ABR played quality 408 may identify ABR sessions at a video resolution of 144p, 240p, 360p, 480p, and 720p (among other alternatives). The information associated with the FBR played quality 410 may identify FBR session at a video resolution of 240p, 360p, and 720p (among other alternatives). The information associated with the number of ABR rate changes 412 may identify a percentage of client devices that experience a particular number of ABR rate changes. To illustrate, in the example of FIG. 4, less than twenty percent of client devices experience one or more ABR rate changes, and less than ten percent of client devices experience four or more ABR rate changes.

Thus, FIG. 4 illustrates an illustrative, non-limiting example of a QoE report that includes various QoE metrics. The QoE report may be useful to a network operator (e.g., a wireless communications network operator) for planning, provisioning, customer service, etc.

Figure 5:
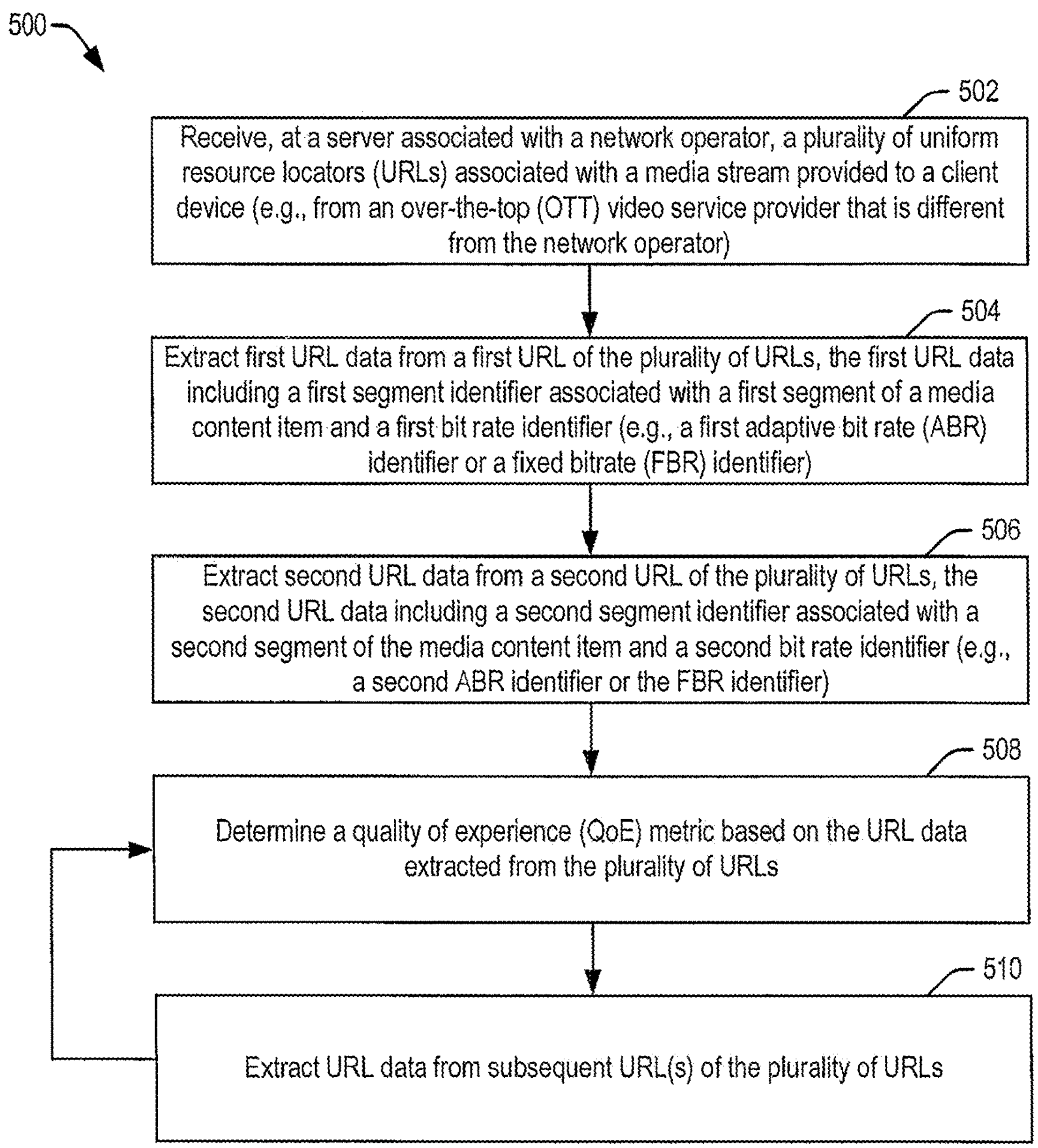
FIG. 5 is a flowchart of an illustrative embodiment of a method of determining a QoE metric based on URL data extracted from a plurality of URLs associated with a media stream provided to a client device.

FIG. 5 illustrates a particular embodiment of a method 500 of determining a QoE metric based URL data extracted from a plurality of URLs associated with a media stream provided to a client device.

In the particular embodiment illustrated in FIG. 5, the method 500 includes receiving, at a server associated with a network operator, a plurality of URLs, at 502. The plurality of URLs, including at least a first URL and a second URL, are associated with a media stream that is provided to a client device (e.g., from an OTT video service provider that is different from the network operator). For example, referring to FIG. 1, the network operator server 102 may receive the URL data 180. The URL data 180 includes at least a first URL corresponding to the first HTTP request 160 from the client device 120 and a second URL corresponding to the second HTTP request 166 from the client device 120. As another example, referring to FIG. 2, the network operator server 102 may receive the URL data 280. The URL data 280 includes at least a first URL corresponding to the first HTTP request 260 from the client device 120 and a second URL corresponding to the second HTTP request 266 from the client device 120.

The plurality of URLs (including at least the first URL and the second URL) may be processed, at the server, to determine a QoE metric. In the particular embodiment illustrated in FIG. 5, processing the plurality of URLs includes extracting first URL data from the first URL, at 504, and extracting second URL data from the second URL, at 506.

To illustrate, extracting first URL data from the first URL, at 504, may include extracting a first segment identifier associated with a first segment of a media content item and a first bit rate identifier (e.g., a first ABR identifier or a FBR identifier). For example, referring to FIG. 1, the URL analysis module 108 may extract the first segment identifier (e.g., "Segment ID(1)") associated with the first segment of the media content item (e.g., the media content item corresponding to "Video ID(1)"). The URL analysis module 108 may also extract the first bit rate identifier (e.g., "Bit Rate ID(1)"). As another example, referring to FIG. 2, the URL analysis module 108 may extract the first segment identifier (e.g., "segment101") associated with the first segment of the media content item (e.g., the media content item corresponding to "50114910"). The URL analysis module 108 may also extract the first bit rate identifier (e.g., "400").

Extracting second URL data from the second URL, at 506, may include extracting a second segment identifier associated with a second segment of the media content item and a second bit rate identifier (e.g., a second ABR identifier or the FBR identifier). For example, referring to FIG. 1, the URL analysis module 108 may extract the second segment identifier (e.g., "Segment ID(2)") associated with the second segment of the media content item (e.g., the media content item corresponding to "Video ID(1)"). The URL analysis module 108 may also extract the second bit rate identifier (e.g., "Bit Rate ID(2)"). As another example, referring to FIG. 2, the URL analysis module 108 may extract the second segment identifier (e.g., "segment102") associated with the second segment of the media content item (e.g., the media content item corresponding to "50114910"). The URL analysis module 108 may also extract the second bit rate identifier (e.g., "200").

The method 500 further includes determining a QoE metric based on the URL data extracted from the plurality of URLs, at 508. For example, referring to FIG. 1, the QoE module 110 may determine a QoE metric (or multiple QoE metrics) based on the URL data 180. As another example, referring to FIG. 2, the QoE module 110 may determine a QoE metric (or multiple QoE metrics) based on the URL data 280.

FIG. 5 further illustrates that, in some embodiments, the method 500 may include extracting URL data from one or more subsequent URLs of the plurality of URLs, at 510. As an example, referring to FIG. 1, the URL analysis module 108 may extract third URL data from a third URL (not shown in FIG. 1) requested by the client device 120. The third URL may include a third segment identifier associated with a third segment (e.g., "SegmentID(3)" not shown in FIG. 1) of the media content item and a third bit rate identifier (e.g., "Bit Rate ID(1)" or "Bit Rate ID(2)" in the example of FIG. 1, where two quality levels are shown). As another example, referring to FIG. 2, the URL analysis module 108 may extract third URL data from a third URL (not shown in FIG. 2) requested by the client device 120. The third URL may include a third segment identifier associated with a third segment (e.g., "segment103" not shown in FIG. 2) of the media content item and a third bit rate identifier (e.g., "400" or "200" in the example of FIG. 2, where two quality levels are shown).

After extracting additional URL data from the subsequent URL(s), the method 500 may return to 508 for determination of a QoE metric based on the URL data extracted from the plurality of URLs. For example, when the URL analysis module 108 of FIGS. 1-2 extracts third URL data (not shown in FIGS. 1 and 2), the QoE module 110 may further determine QoE metric(s) based on the third URL data.

Thus, FIG. 5 illustrates an example of a method of determining a QoE metric based URL data extracted from a plurality of URLs associated with a media stream provided to a client device.

Figure 6:
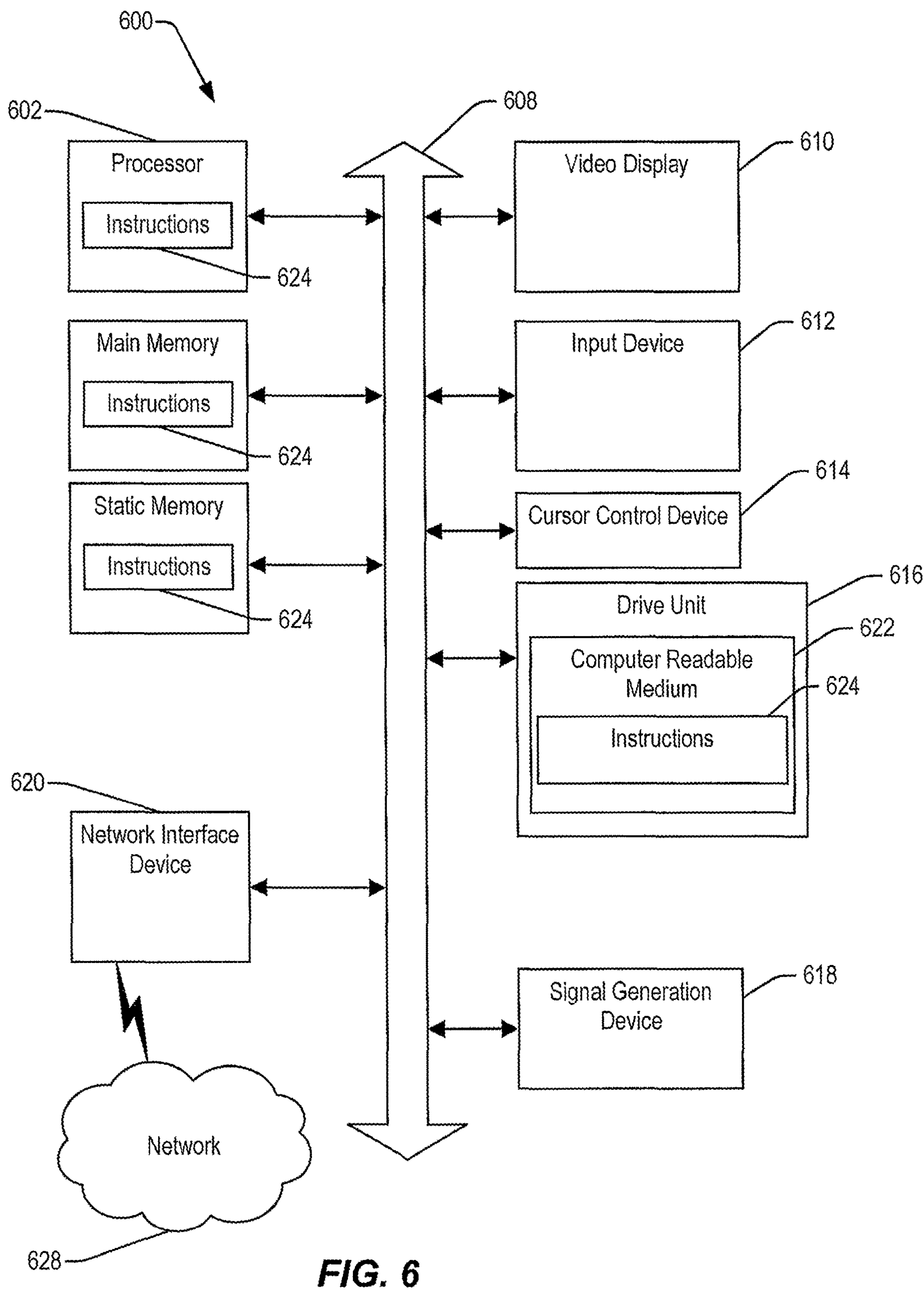
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the client device 120 or the servers 102, 130, 136, 236, 336 described with reference to FIGS. 1-3.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. For example, the processor 602 may include or correspond to the processor 104 illustrated in FIGS. 1-3, or the processor 122 of the client device 120 illustrated in FIGS. 1-3. Moreover, the computer system 600 may include a main memory 604 and a static memory 606, which can communicate with each other via a bus 608. For example, the main memory 604 may include or correspond to the memory 106 of the network operator server 102 illustrated in FIGS. 1-3. As another example, the main memory 604 may correspond to the memory 124 of the client device 120 illustrated in FIGS. 1-3.

As shown, the computer system 600 may further include a video display unit 610, such as a liquid crystal display (LCD), a light emitting diode (LED) display, a touch screen display, a flat panel display, or a solid state display. Additionally, the computer system 600 may include an input device 612, such as a remote control device or a keyboard, and a cursor control device 614, such as a mouse. In some embodiments, the input device 612 and the cursor control device 614 may be integrated into a single device, such as a capacitive touch screen input device. The computer system 600 may also include a signal generation device 618, such as a speaker, and a network interface device 620. Some computer systems 600 may not include an input device (e.g., a server may not include an input device).

In a particular embodiment, as depicted in FIG. 6, the device 600 may include computer-readable storage 622 in which one or more sets of instructions 624, e.g. software, can be embedded. The computer-readable storage 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 624 may embody one or more of the methods or logic as described herein. The instructions 624 may be executable by the processor 602 to perform one or more functions or methods described herein, such as the method 500 described with reference to FIG. 5. In a particular embodiment, the instructions 624 may reside completely, or at least partially, within the main memory 604, the static memory 606, and/or within the processor 602 during execution by the computer system 600. The main memory 604 and the processor 602 also may include a computer-readable storage device.

In a particular embodiment (e.g., when the computing device 600 corresponds to a server associated with a network operator), the instructions 624 may be executable by the processor 602 to process a plurality of URLs associated with a media stream provided to a client device. The instructions 624 may be further executable by the processor 602 to process the plurality of URLs (including at least a first URL and a second URL) to determine a QoE metric. For example, the instructions 624 may be executable by the processor 602 to extract first URL data from the first URL. The first URL may include a first segment identifier associated with a first segment of a media content item and a first bit rate identifier. The instructions 624 may be executable by the processor 602 to extract second URL data from the second URL. The second URL may include a second segment identifier associated with a second segment of the media content item and a second bit rate identifier. The instructions 624 may be further executable by the processor 602 to determine the QoE metric based at least in part on the first URL data and the second URL data.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 622 that stores instructions 624, so that a device cO lmected to a network 628 may communicate voice, video or data over the network 628. While the computer-readable storage 622 is shown to be a single device, the computer-readable storage 622 may include a single device or multiple devices, such as a centralized or distributed database, and/or associated caches and servers that store one or more sets of instructions. The computer-readable storage 622 is capable of storing a set of instructions for execution by a processor to cause a computer system to perform any one or more of the methods or operations disclosed herein. For example, the computer-readable storage device 622 may store instructions for execution by a processor to cause a computer system to perform the method 500 described with reference to FIG. 5.

In a particular non-limiting, exemplary embodiment, the computer-readable storage 622 may include a solid-state memory such as embedded memory (or a memory card or other package that houses one or more non-volatile read-only memories). Further, the computer-readable storage 622 may be a random access memory or other volatile re-writable memory. Additionally, the computer-readable storage 622 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

receiving, from a log of requests at a server associated with an operator, a plurality of uniform resource locators associated with delivery of a media stream to a communications device by the operator from a third party service provider different than the operator;

determining, at the server, quality of experience metric information from uniform resource locator pairs of the plurality of uniform resource locators, wherein each uniform resource locator pair includes a first uniform resource locator of the plurality of uniform resource locators that corresponds to a first segment of the media stream requested by the communications device and a second uniform resource locator of the plurality of uniform resource locators that corresponds to a second segment of the media stream requested by the communications device after the communications device requests the first segment; and determining, at the server, first quality of experience information for the delivery of the media stream to the communications device by devices of the operator based on the quality of experience metric information.

2. The method of claim 1, further comprising sending a report from the server to a network operator device, the report based on quality of experience information associated with the media stream, wherein the quality of experience information includes the first quality of experience information.

3. The method of claim 1, wherein the determining the quality of experience metric information comprises:

extracting first data from a first uniform resource locator of a uniform resource locator pair, the first data associated with a first segment of the media stream;

extracting second data from a second uniform resource locator of the uniform resource locator pair, the second data associated with a second segment of the media stream; and determining the quality of experience metric information based on comparisons of portions of the first data to corresponding portions of the second data.

4. The method of claim 3, wherein the quality of experience metric information indicates a change from a first adaptive bit rate to a second adaptive bit rate during the delivery of the media stream.

5. The method of claim 3, wherein the second data indicates a trick play operation performed on the media stream, and wherein the trick play operation includes a fast forward of the media stream, a pause of the media stream, or a rewind of the media stream.

6. The method of claim 1, wherein receiving the plurality of uniform resource locators comprises receiving the plurality of uniform resource locators on a communication path used by the operator to deliver the media stream to the communications device from the third party service provider.

7. The method of claim 1, wherein receiving the plurality of uniform resource locators comprises receiving the plurality of uniform resource locators external to a communication path used by the operator to deliver the media stream to the communications device from the third party service provider.

8. The method of claim 1, wherein receiving the plurality of uniform resource locators comprises receiving the plurality of uniform resource locators from an over-the-top video service provider.

9. The method of claim 8, wherein receiving the plurality of uniform resource locators comprises receiving the plurality of uniform resource locators from the over-the-top video service provider communicated via a wireless communications network to the communications device.

10. The method of claim 1, wherein determining the first quality of experience information comprises identifying a video resolution, a frame rate, a video encoding rate, an audio encoding rate, or a combination thereof.

11. A machine-readable medium, comprising executable instructions that, when executed by a processing system including a processor, facilitate performance of operations, the operations comprising:

receiving, from a log of requests, a plurality of uniform resource locators associated with delivery of a media stream to a communications device by an operator from an over-the-top video service provider, wherein the operator operates a wireless communications network, and wherein the media stream was communicated from the over-the-top video service provider via the wireless communications network to the communications device;

determining quality of experience metric information from uniform resource locator pairs of the plurality of uniform resource locators, wherein each uniform resource locator pair includes a first uniform resource locator corresponding to a first segment of the media stream and a second uniform resource locator corresponding to a second segment of the media stream after the communications device requests the first segment; and determining first quality of experience information for the delivery of the media stream to the communications device by network devices of the operator based on the quality of experience metric information.

12. The machine-readable medium of claim 11, wherein the operations further comprise:

sending a report to a device of the operator, the report based on quality of experience information associated with the media stream requested from the over-the-top video service provider, wherein the quality of experience information includes the first quality of experience information.

13. The machine-readable medium of claim 11, wherein determining the quality of experience metric information comprises determining an estimated mean opinion score, the estimated mean opinion score including a bit rate metric, a rate switching metric, a stall metric, an abandonment metric, or a combination thereof.

14. The machine-readable medium of claim 11, wherein the receiving the plurality of uniform resource locators comprises receiving the plurality of uniform resource locators from a database storing a log of client device requests.

15. The machine-readable medium of claim 11, wherein determining the quality of experience metric information comprises:

extracting first data from a first uniform resource locator of a uniform resource locator pair, the first data associated with a first segment of the media stream;

extracting second data from a second uniform resource locator of the uniform resource locator pair, the second data associated with a second segment of the media stream; and determining the quality of experience metric information based on comparisons of portions of the first data to corresponding portions of the second data.

16. A system comprising:

a processing system including a processor; and a memory that stores executable instructions that, when executed by the processing system, facilitate performance of operations, the operations comprising:

receiving, from a log of communications device requests, a plurality of uniform resource locators associated with a media stream provided to a communications device by an operator from a third party service provider;

extracting first data from a first uniform resource locator of the plurality of uniform resource locators, the first data associated with a first segment of the media stream;

extracting second data from a second uniform resource locator of the plurality of uniform resource locators, the second data associated with a second segment of the media stream;

comparing portions of the first data to corresponding portions of the second data; and determining first quality of experience metric information based on the comparing.

17. The system of claim 16, further comprising a database configured to store the log of communication device requests.

18. The system of claim 16, wherein extracting first data comprises extracting a fixed bit rate identifier, and wherein extracting the second data comprises extracting the fixed bit rate identifier.

19. The system of claim 16, wherein the operations further comprise:

extracting third data from a third uniform resource locator, the third data associated with a third segment of the media stream, wherein the third segment corresponds to a segment requested by the communications device after the communications device requested the second segment;

comparing portions of the second data to corresponding portions of the third data; and determining the first quality of experience metric information based on the comparing the portions of the second data to corresponding portions of the third data.

20. The system of claim 16, wherein the operations further comprise:

determining first quality of experience information for delivery of the media stream to the communications device via network devices of the operator based in part on the first quality of experience metric information.

* * * * *